(12) United States Patent
Loebinger

(10) Patent No.: US 10,716,268 B2
(45) Date of Patent: Jul. 21, 2020

(54) DRIP IRRIGATION HOSE WITH STRIP

(71) Applicant: THE MACHINES YVONAND SA, Yvonand (CH)

(72) Inventor: Ahai Loebinger, Yvonand (CH)

(73) Assignee: THE MACHINES YVONAND SA, Yvonand (CH)

( * ) Notice: Subject to any disclaimer, the term of this patent is extended or adjusted under 35 U.S.C. 154(b) by 114 days.

(21) Appl. No.: 15/750,194

(22) PCT Filed: Aug. 3, 2016

(86) PCT No.: PCT/EP2016/068572
§ 371 (c)(1),
(2) Date: Feb. 4, 2018

(87) PCT Pub. No.: WO2017/021462
PCT Pub. Date: Feb. 9, 2017

(65) Prior Publication Data
US 2018/0220601 A1  Aug. 9, 2018

(30) Foreign Application Priority Data

Aug. 6, 2015  (EP) .................................... 15180002

(51) Int. Cl.
*A01G 25/02* (2006.01)
*B05B 1/30* (2006.01)

(52) U.S. Cl.
CPC .......... *A01G 25/023* (2013.01); *B05B 1/3006* (2013.01); *B05B 1/3013* (2013.01); *Y02A 40/237* (2018.01)

(58) Field of Classification Search
CPC .. A01G 25/023; B05B 1/3006; B05B 1/3013; Y02A 40/237

USPC ....... 239/533.1, 533.13, 542, 547, 562, 570, 239/571
See application file for complete search history.

(56) References Cited

U.S. PATENT DOCUMENTS

| | | | |
|---|---|---|---|
| 6,382,530 B1 | 5/2002 | Perkins | |
| 7,735,758 B2 * | 6/2010 | Cohen | A01G 25/023 239/542 |
| 8,096,491 B2 * | 1/2012 | Lutzki | F16K 23/00 239/533.1 |
| 8,763,934 B2 * | 7/2014 | Patel | A01G 25/023 239/542 |
| 2003/0150940 A1 | 8/2003 | Vildibill et al. | |
| 2013/0248616 A1 | 9/2013 | Ensworth et al. | |

OTHER PUBLICATIONS

International Searth Report (dated Oct. 24, 2016) for corresponding International App. PCT/EP2016/068572.

\* cited by examiner

*Primary Examiner* — Steven J Ganey
(74) *Attorney, Agent, or Firm* — WRB-IP LLP

(57) ABSTRACT

A strip is provided for distributing water that is provided at an inner surface of a drip irrigation hose. The strip for distributing water having a repetitive labyrinth segment, wherein a plurality of profiles are provided at the base of the strip, the labyrinth segment comprises: a water input section; a regulating section arranged downstream from the water input section, wherein the regulating section is provided to regulate water flow rate of the strip in response to water pressure of a hose; a discharge section arranged downstream from the regulating section, wherein the discharge section is provided with deflection-resistant reinforcement means.

15 Claims, 4 Drawing Sheets

DRIP IRRIGATION HOSE WITH STRIP

BACKGROUND AND SUMMARY

The present invention relates to a continuous-type emitter for distributing water in a constant flow rate. In particular, the present invention provides means for water distribution by using for example a pressure compensating strip such as a continuous emitter having a first profiles and a second profiles in a regulating section, thus allows for excellent fine-tuning of water flow rate and water pressure regulation.

There are several types of irrigation systems widely used nowadays, depending on how the water is distributed throughout the field. Some common types of irrigation systems include, for example, surface irrigation, sprinkler irrigation and localized irrigation. In surface irrigation, water is distributed over and across land by gravity, and no mechanical pump involved. In sprinkler irrigation, water is distributed by overhead high-pressure sprinklers or guns from a central location in the field or from sprinklers on moving platforms.

These systems have numerous shortcomings, including inefficient use of water and fertilizers, poor water distribution and poor uniformity of water application on steep or uneven terrain. In view of these shortcomings, localized irrigation has been developed, where water is distributed under low pressure, through a piped network and applied to each plant.

Drip irrigation is a type of localized irrigation in which drops of water are delivered at or near the root of plants. In this type of irrigation, evaporation and runoff are minimized. A type of discrete emitter has been widely used in the drip irrigation system. However, such discrete emitter often consists of multiple parts, thus entails higher production cost, and therefore is less favorable in some instances due to economical reasons.

Discrete emitters are commonly being used when a larger distance of water outlets are required, for instance a water outlet in about every 20 cm or more for each segment water outlet. In this case, discrete emitters are more economically to be used compared to a continuous emitter. When water outlets are needed to be repeated in a shorter distance, for example less than every 20 cm, an elongated emitter is advantageously a more favorable option.

On another hand, some types of continuous emitter may consist of flexible tunnel-like emitter. Said tunnel-like emitter reduces water pressure (and hence water outflow rate) when, water pressure of the hose is high. However, such type of flexible emitters face problems of higher fluctuation of water outflow, as water could bypass the tunnel-like emitter. Fine-tuning of the water outflow and/or water pressure thus fails to be realised in such kind of continuous emitter.

Furthermore, a lower cost of production and an easier production of a pressure compensating elongated flat sheet in a drip irrigation hose is also needed.

Therefore, there remains a need to create a new, easier production, low cost, elongated-typed emitter such as a strip to emit water in an even shorter distance while able to maintain water pressure and/or water flow rate over a wide distance. Furthermore, water pressure in the drip irrigation hose that is better fine-tuned remained a challenge to be realised.

The inventors of the present invention have surprisingly found out that the above-formulated need can be met by creating a specially-designed strip that is pressure-compensated, elastic, able to fine-tune water flow rate and regulate water pressure. The strip is provided to be able to simultaneously response, regulate and reduce water flow rate and/or water pressure thanks to an array of specially designed profiles in a regulating section of the strip. This advantageously allows for a lower cost, of production, shorter labyrinth segment, hence allowing for more repetitive labyrinth segments and more water outlets within a shorter distance. Hence, water is able to be distributed through outlets on the drip irrigation hose in a shorter distance, for example, less than about 10 cm, or even less than 5 cm without affecting the water flow rate of the pressure compensating strip. Furthermore, water pressure and water outflow can be better fine-tuned thanks to the different profiles provided in the regulating section of the strip, as water flows through the entire length of labyrinth segment of the strip. Under higher water pressure condition, certain profiles are pushed towards the hose, thereby creating additional barrier within the labyrinth. This enables water pressure to be regulated in an optimal condition, allowing fine-tuning of water outflow condition and water pressure in the strip.

In a first aspect, the present invention therefore relates to a strip for distributing water, said strip has a repetitive labyrinth segment, wherein a plurality of profiles are provided to the base of the strip, said labyrinth segment comprises: a water input section; a regulating section arranged downstream from the water input section, wherein said regulating section is provided to regulate water flow rate of the strip in response to water pressure of a hose; a discharge section arranged downstream from the regulating section, wherein said discharge section is provided with deflection-resistant reinforcement means. In addition to the advantages described above, the discharge section of the strip according to the present invention allows water to be evenly distributed in a controllable manner, as reinforcement means is provided to reduce frequency of deflection caused by water pressures which exits from the outlets.

In a second aspect, the present invention relates to a pressure compensating drip irrigation hose comprising the aforementioned strip as described herein.

According to a variant of the present invention, said strip is made of at least one elastomeric material. This advantageously allows for not only a lower cost of production and easier production, it allows for the drip irrigation hose to be arranged in all possible positions without hindering the flexibility of the hose.

According to yet another variant of the present invention, the water input section is provided with a filter means. This advantageously allows for water to be filtered before entering into the regulating section.

According to another variant of the present invention, the distance between the profiles in the input section are less than the distance between the profiles in the regulating section. This advantageously prevents particles larger than the gap between profiles in the water input section to be entered into the regulating section of the strip.

According to one preferred embodiment of the present invention, the strip has two rails, forming side walls of the strip. The rails could exist in both the regulating section and the discharge section. This allows water to enter into the strip only through the water input section which has a filter means to filter out certain particles having diameter larger than the gap between profiles of water input section. The filtered water then flows alone the labyrinth segment.

According to one preferred embodiment of the present invention, said profiles in the regulating section comprises a first profiles, a second profiles and/or farther profiles, wherein the first profiles is a rectangular-shaped block whereas the second profiles have a wedge shape. The first profiles, the second profiles and/or further profiles in the regulating section have a barrier-like partition structure extended from the rails of the strip. The first profiles are advantageously designed to set a limitation of a fixed volume of water flowing in the strip. This allows for a certain predetermined water flow rate and/or water pressure flowing in the strip. This prevents voids of the strip to collapse under situation where water pressure is extremely high in the hose. The second profiles of the regulating section are advantageously designed to be able to response, regulate and reduce water pressure and/or water flow rate of the strip according to water pressure within the drip irrigation hose. Importantly, in the present invention, water flows along the entire labyrinth segment of the strip. On one hand, the first profiles allow for a maximum volume of water flowing in the strip; on another hand, the second profiles fine-tune water pressure and/or water flow rate of the strip depending on the water pressure of the hose. Such combination of at least two different profiles in the regulating section of the strip thus allows an optimal pressure compensating drip irrigation hose to be realised.

According to one preferred embodiment of the present invention, the entire top surface of the first profiles opposite to the base of the strip are connected to an inner part of a hose. This allows said type of first profiles to be fixed permanently between the strip and the hose, thus allowing a fixed volume of water flowing within the strip.

According to one embodiment of the present invention, the profiles in the regulating section are provided in an alternative and/or regular or irregular fashion throughout the repeated labyrinth segment. In order to allow water flow rate of the strip and its response to water pressure of the hose to be regulated in a wider range, higher number of the second profiles having a wedge shape than the first profiles could be arranged in the regulating section of the strip. Contrary, in order to better fine-tune water outflow (water flow rate in the strip) and its response to the water pressure of the hose, less number of the second profiles than the first profiles can be used to achieve the aforementioned goal.

According to one preferred embodiment of the present invention, the discharge section is provided with interconnected reinforcements to increase the resistance of deflection.

According to another preferred embodiment of the present invention, the interconnected reinforcements are provided at the base of the strip. This fortifies said section, allowing for stronger structure.

According to one preferred embodiment of the present invention, the interconnected reinforcements have height less than the top surface of the rails of the strip so that their influence on disturbing water flow rate is minimised.

According to yet another preferred embodiment of the present invention, the strip is provided at an inner surface of the drip irrigation hose.

According to one preferred embodiment of the present invention, the strip is made up of material less stiff than the drip irrigation hose so, that the flexibility of the hose is not affected by the strip operatively connected within.

According to one preferred embodiment of the present invention, at least one outlet of the hose is provided at the discharge section of the strip. This allows for instaneously water outflow.

According to the present invention, the outlet is an open-end outlet or a slit. Both open end outlet and slit outlet allow water to be emitted easily Furthermore, slit outlets further prevent the roots of the plants from growing into the drip irrigation hose.

Thanks to the present uniquely designed strip having a water input section, a regulating, section and a discharge section which form a labyrinth segment, the labyrinth segment of the strip according to the present invention is able to be designed in various length, for instance less than 10 cm. It is possible to be less than 8 cm. It is also designed for less than 5 cm without affecting the functionality of the pressure compensating strip and its water flow rate as well as fine-tuning its response to water pressure of the hose.

BRIEF DESCRIPTION OF THE DRAWINGS

The drawings are not necessarily drawn to scale, emphasis instead is generally being placed upon illustrating the principles of various embodiments. In the following description, various embodiments of the invention are described with reference to the following drawings.

DETAILED DESCRIPTION

Figure 1:
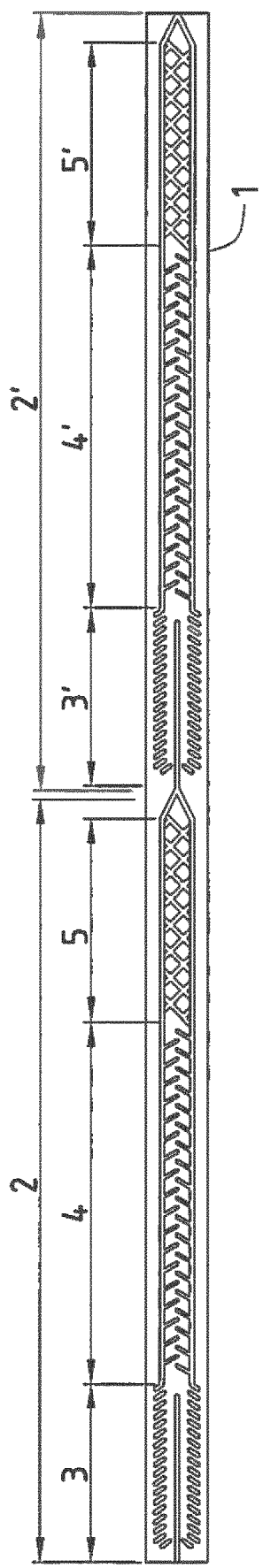
FIG. 1: One embodiment of a snip having a repetitive labyrinth according to the present invention.

In order to overcome the above described drawbacks of emitters in the art, a new strip (1) connected to a drip irrigation hose (9) for distributing is espoused. Said strip (1) comprised of a repetitive labyrinth segment (2, 2'), the labyrinth segment has a water input section (3, 3'), followed by a regulating section (4, 4') and subsequently a discharge section (5, 5'), wherein a plurality of profiles (21, 24, 25, 26) are provided to the base (15) of the strip (1), wherein said regulating section (4, 4') is provided to regulate water flow rate of the strip (1) in response of water pressure of a hose. It also simultaneously regulates and responses to water pressure within a certain predetermined water pressure level; a discharge section (5, 5') arranged downstream from the regulating section (4, 4'), wherein said discharge section is provided with deflection-resistant reinforcement means, (such as profiles 26).

FIG. 1 shows a schematic representation of an exemplary embodiment of the strip of the present invention. The strip 1 has a repetitive labyrinth segment 2, 2', 2". In each segment of the labyrinth, it is comprised of a water input section 3, 3', a regulating section 4, 4'; and a discharge section 5, 5'. The strip 1 can be made up of any elastomeric materials such as thermoplastic elastomeric synthetic polymer or natural rubber including commonly used polymers such Polybutadiene, EVA and etc.

Figure 2A:
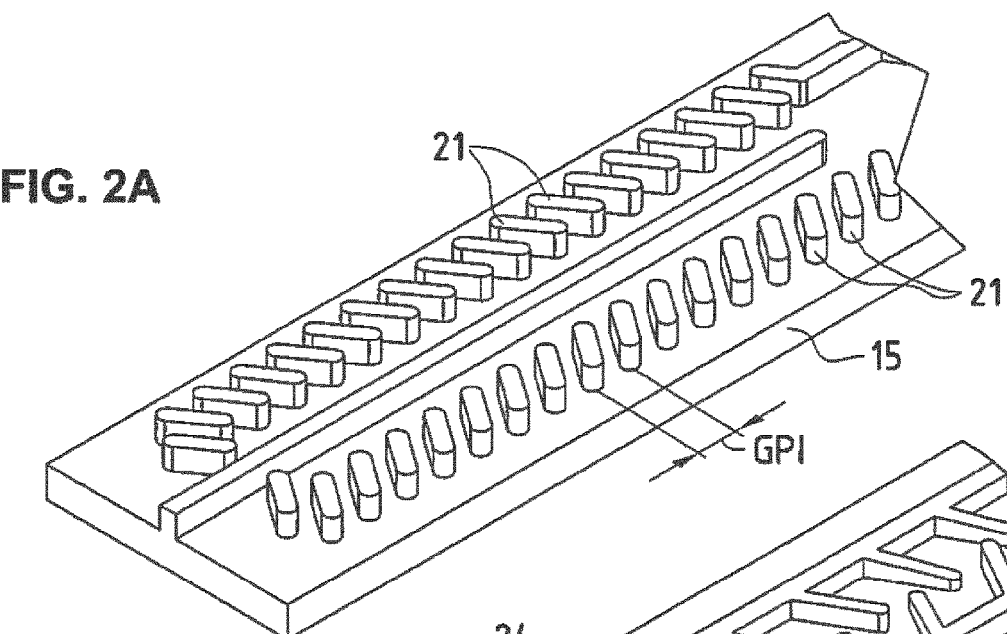
FIG. 2A: Enlarged top plan of a water input section as shown in FIG. 1 defined by reference number 3 and 3'.
Figure 2B:
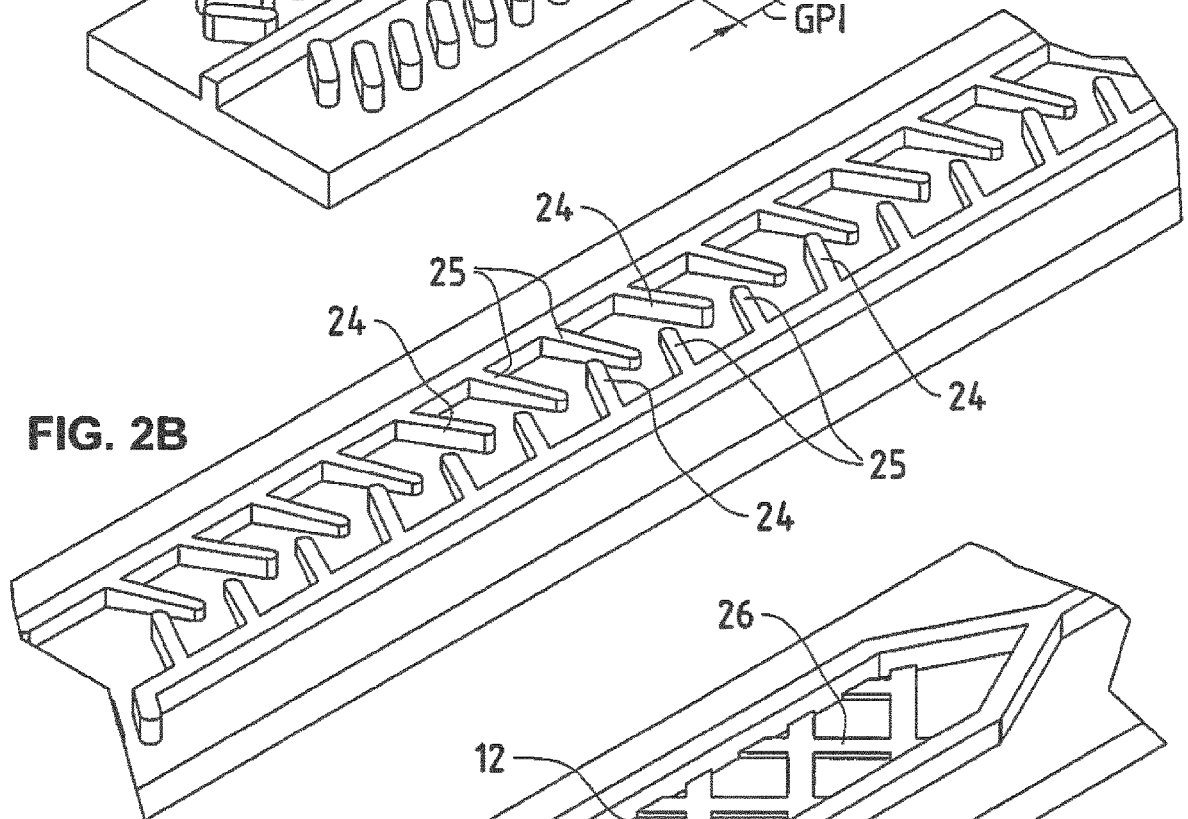
FIG. 2B; Enlarged top plan of a regulating section as shown in FIG. 1 defined by reference number 4 and 4'.
Figure 2C:
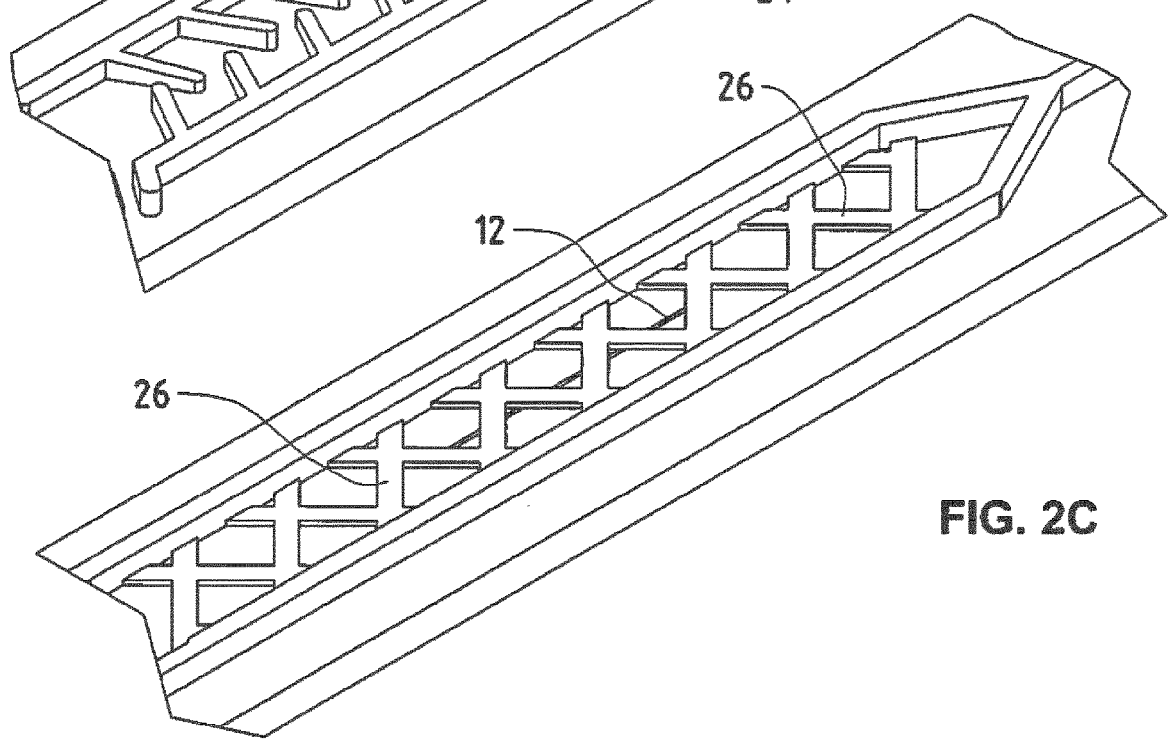
FIG. 2C: Enlarged top plan of a discharge section as shown in FIG. 1 defined by reference number 5 and 5'.

FIG. 2A-C show enlarged top plan of a water input section (FIG. 2A), a regulating section (FIG. 2B) and a discharge section (FIG. 2C). As can be seen in FIG. 2A, a plurality of profiles 21 are provided at the base (15) of the strip 1. In this particular example, two rows of closely-aligned profiles 21 are arranged at the water input section 3, 3'. A gap GPI exists between each profiles 21 of the water input section. The profiles 21 in the water input section 3 serves as filters to filter out any particles larger than the gap GPI between the profiles 21. Similarly, another gap GPII exists between a first profiles 24 and a second profiles 25 in the regulating section 4 (FIG. 3B). The gap GPI between profiles 21 in the water input section 2 is less than the gap GPII between the first and second profiles 24, 25 in the regulating section. This arrangement is able to block any particles larger than, the gap GPI in the water input section from entering into the regulating section 3. Therefore, a filter mechanism is provided through the arrangement of various types of profiles 21, 24, 25.

As can be clearly seen in the FIGS. 2B and 2C, two rails 22 are located at both sides of the strip 1, namely at the regulating section 4 and at the discharge section 5, but is absent at the water input section 3. As a consequences, water from the drip irrigation hose is capable to first enters through the water input section 3, 3' of each of the repeated labyrinth segment 2, 2', followed by entering the regulating section 4, 4' and finally the discharge section 5, 5' which is arranged downstream from the regulating section. At least one outlet opening 12 is provided at the drip irrigation hose 9 that sits on top of the discharge section 5, 5'.

Figure 3A:
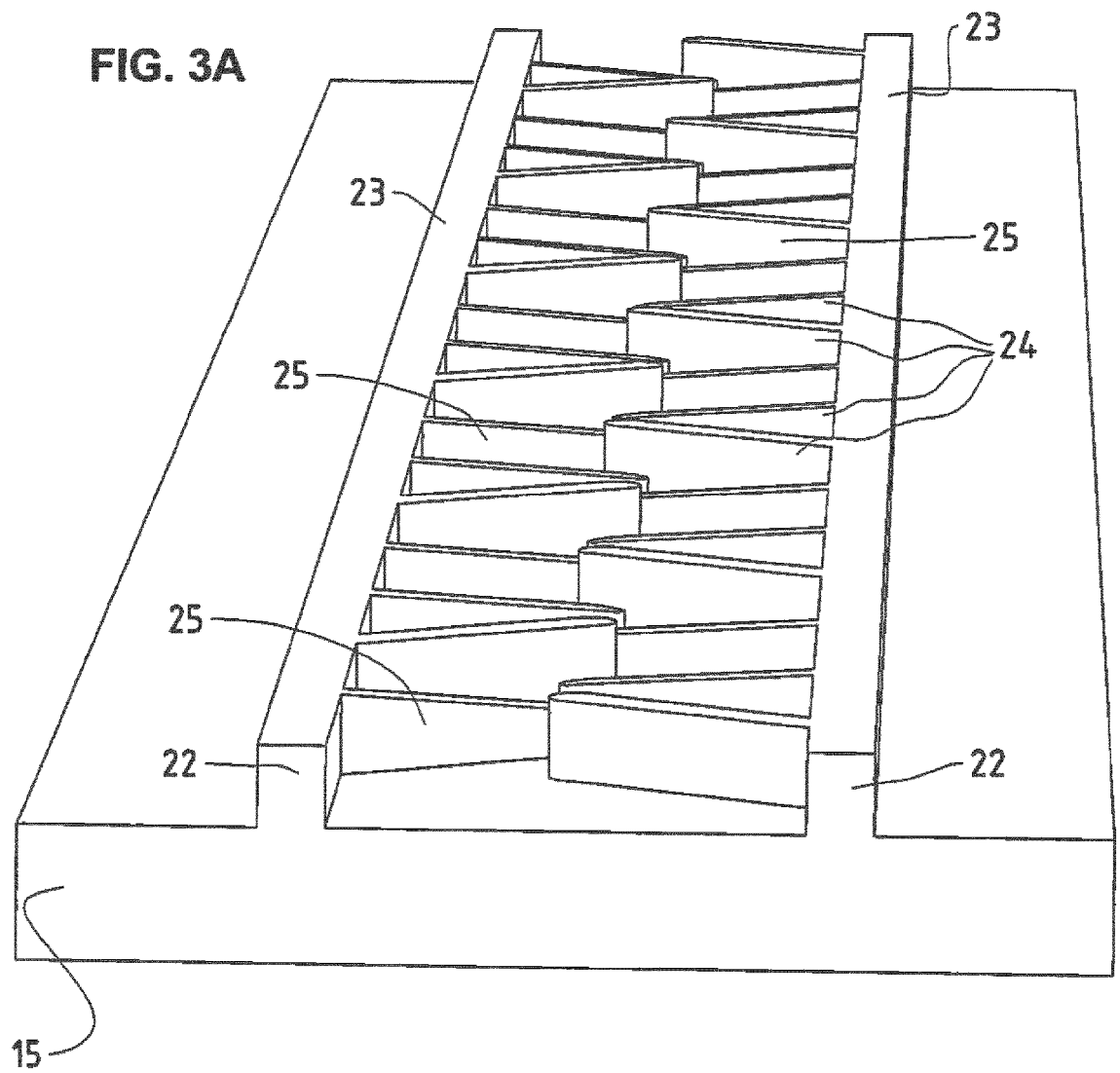
FIG. 3A: Scaled-up bird eye's view of the regulating section having first profiles and second profiles, and two rails forming side walls of the strip.
Figure 3B:
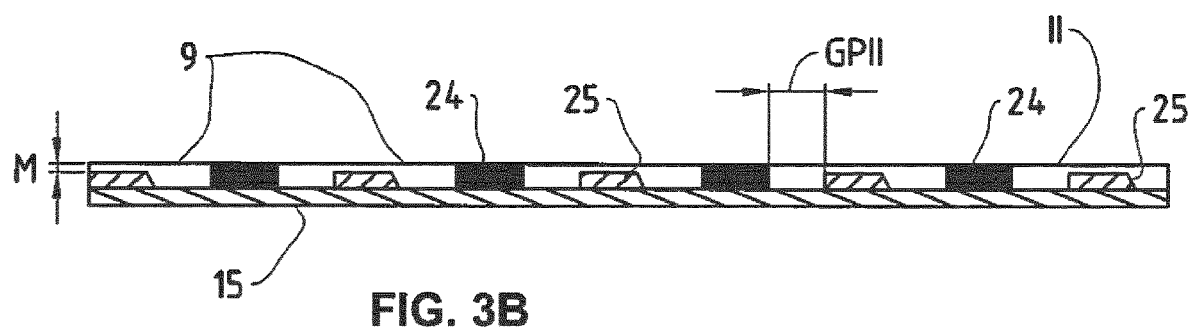
FIG. 3B: Longitudinal-sectional view taken at regulating section showing the difference of heights between the first profiles and the second profiles.

FIG. 3A shows a scaled-up bird eye's view of a regulating section 4 having two rails 22. In this particular example, two different types of profiles 24, 25 are shown. The profiles 24, 25 are provided at the base 15 of the strip 1. The first profiles 24, which are rectangular shape partitions, have the same height across its top surface 23 as to the top surface of the rails 22. The second profiles 25, which are wedge-shape partitions, have gradually reducing height moving to the centre of the strip 1 compared to the side connected to the rails 22.

In this particular example, the second profiles 25 having a wedge-shaped profile (and having height less than the top surface 23 of the mil 22 of the strip 1) are being sandwiched by two first profiles 24 that have a rectangular-shaped profile (across the top surface opposite to the base 15 having the same height as to the top surface 23 of the rail 22 of the strip 1). This arrangement is repeated in a regular (consistent) manner. However, an irregular arrangement with different proportion of first profiles 24 and second profiles 25 can also be realised for different purposes.

The first profiles 24 (or so-called a fixed profile) serve to limit a certain maximum volume of water flowing in the strip 1. In other words, water pressure of the drip irrigation hose does not affect the reaction of the first profiles 24. On another hand, the top surface of the second profiles 25 (or so-called a flexible profile) opposite to the base 15 of the strip 1 are not connected to the drip irrigation hose 9, hence the second profiles 25 are able to response according to the water pressure of the drip irrigation hose 9 in order to regulate water flow rate as well as water pressure of the strip 1, thanks to its gradually decreasing height towards the centre of the strip.

By employing this arrangement of two different types of profiles 24, 25 within one single section of the strip 1, water pressure and water flow rate are able to be regulated consistently in a precise annex. Also fine-tuning of the water outflow rate as well as water pressure of the strip can be achieved thanks to these profiles 24, 45, 26 of the strip 1.

FIG. 3B shows a longitudinal sectional view of the regulating section (4, 4') of the strip 1. As can be clearly seen, the first profiles 24 are connected between the base 15 of the strip 1 and an inner surface of the drip irrigation hose 9. The top surface of the second profiles 25 opposite to the base 15 of the strip 1 are not connected to an inner surface of the strip irrigation hose 9. A distance M thus exists. When water pressure of drip irrigation hose 9 is low, the second profiles are not being pushed towards the inner surface of the drop irrigation hose. To the contrary, when water pressure of the drip irrigation hose 9 increases, the second profiles 25 are being pushed towards the inner surface of the drip irrigation hose 9, thus closes the gap M, creating, additional labyrinth paths within the existing labyrinth. This allows for a fine-tuned and more consistent method of regulating water outflow rate of the strip.

It is to be understood that different arrangements of the first and second profiles can be arranged m order to give a certain water pressure as well as water outflow rate of the strip 1. Hence, it could be easily comprehended that the more number of the second profiles 25 are being provided than the first profiles 24, the larger amount of water would be able to flow within the strip 1, thus a larger response to the water pressure within the drip irrigation hose could be regulated.

Moreover, a further different type of profiles 27, 28 (third, fourth . . . ) in the regulating section 4, 4' of the strip may also exist in the regulating section 4 for a particular reason, for instance to further distribute or lower water pressure, reinforce the strip 1 in order to reduce deflection forces resulting from water droplets exiting from outlets 12 of the drip irrigation hose or to maintain a certain water pressure within the strip 1.

Figure 4:
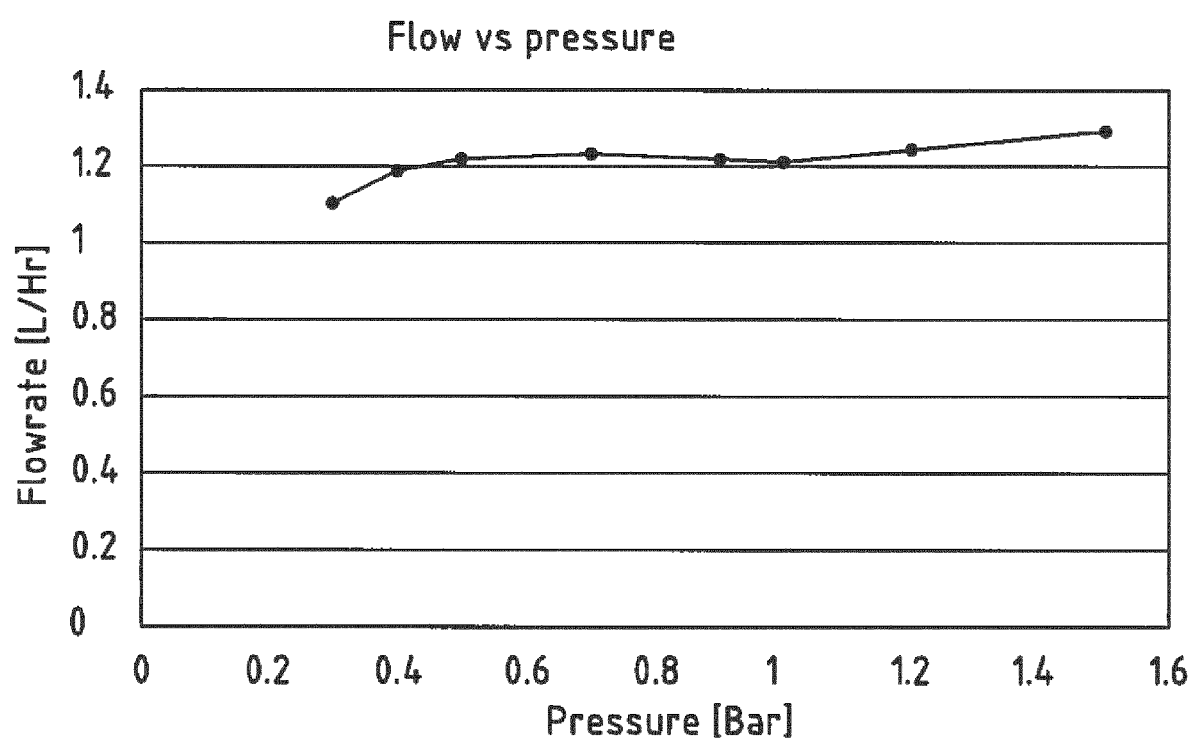
FIG. 4: Graph showing the relation between water flow at different water pressure according to the present invention.

FIG. 4 shows a test result indicating that the present invention is able to function as pressure compensating strip 1, when said strip 1 is operatively connected to a drip irrigation hose 9. Different water pressures ranging from 0.3 to 1.5 Bar were used in the test, nevertheless, the resulting water flow rates (and outflow rate) are consistently ranging between 1.1 to 1.3 liter per hour. This experimental result clearly proves that the labyrinth segment according to the present invention, in particular the regulating section that has a first type of profiles 24 and a second type of profiles 25 which function closely together but differently, is able to regulate and fine-tune water flow rate and its response to water pressure in a pressure compensating manner.

This test result indicates that the profiles 24, 25 in the regulating section of the strip 1 interdisposed from each other in an alternative, regular or irregular manner, repetitively, work as if said profiles are being arranged separately in two different sections. Hence, it is apparent that present invention is superior in the sense that a unified section of regulating section according to the present invention is able to regulate water flow rate in an unexpected excellent manner. Nevertheless, shorter labyrinth segment, which is required sometimes to irrigate closely located vegetations, can be achieved by using the present invention.

By "about" in relation to a given numerical value such as length, distance, amount or a period of time, it is meant to include numerical values within 10% of the specified value.

The terms "at least one" and "one or more" as used herein are interchangeable and relate to at least 1 and include 1, 2, 3, 4, 5, 6, 7, 8, 9 and more.

The term "irrigation hose" is used herein generically to refer to any and all types of irrigation hose, whether seamless or formed with a welded seam, and independent of the structural material, the wall thickness or the degree of flexibility of the hose.

The term "profiles" is used to refer to any barriers or partition walls having any particular shapes, which function to redirect the flow of water of a strip.

The term "labyrinth" is used to refer to any flow restriction which is implemented as a long thin flow path, and most typically, as a meandering or zigzag flow pattern which allows water to flow throughout its entire length. The barriers between sections or legs of the path are referred to as "profiles", "baffles" or "teeth", and may be of any shape.

The term "elastomer" is used herein in the description and claims to refer to any elastomeric material with sufficient flexibility to provide variable geometry flow regulation as taught in the context of the various embodiments below, and for which the elastic behavior is roughly repeatable. Preferred examples of suitable elastomers include, but are not limited to, thermoplastic elastomers (TPE) such as SANTOPRENE® and thermosetting polymers such as silicone.

Reference is made to a variable geometry flow path which serves to "regulate" the strip's water flow, and to provide a "compensated" strip (drip emitter). In this context, the terms "regulate" and "compensate" are used to refer to pressure responsive properties which at least partially compensate for variations in flow rate which would otherwise result from variations in the pressure within the irrigation hose.

Other embodiments are within the following claims and non-limiting examples. It is to be understood that these examples are for illustrative purposes only and are not to be construed to limit the scope of the present invention.

The invention claimed is:

1. A strip for distributing water having a repetitive labyrinth segment, wherein a plurality of profiles are provided to a base of the strip, the labyrinth segment comprising:
   a water input section;
   a regulating section arranged downstream from the water input section, wherein the regulating section is provided to regulate water flow rate of the strip in response to water pressure of a hose, the regulating section being arranged to simultaneously regulate both water pressure and water flow rate; and
   a discharge section arranged downstream from the regulating section, wherein the discharge section is provided with deflection-resistant reinforcement means, wherein the regulating section comprises two rails, the profiles in the regulating section comprise first profiles and second profiles extending from each of the two rails, and the first profiles and the second profiles differ in shape from each other.

2. The strip according to claim 1, wherein the two rails form side walls of the strip.

3. The strip according to claim 1, wherein the water input section is provided with a filter means.

4. The strip according to claim 1, wherein a distance between the profiles in the input section is less than a distance between the profiles in the regulating section.

5. The strip according to claim 1, wherein the profiles in the regulating section are provided in an alternative and/or regular or irregular fashion throughout the repeated labyrinth segment.

6. A pressure compensating drip irrigation hose comprising the strip according to claim 1.

7. The pressure compensating drip irrigation hose according to claim 6, wherein the strip is provided at an inner surface of the drip irrigation surface.

8. The pressure compensating drip irrigation hose according to claim 6, wherein the strip is made up of material less stiff than the pressure compensating drip irrigation hose.

9. The pressure compensating drip irrigation hose according to claim 6, wherein at least one outlet of the hose is provided at the discharge section of the strip.

10. The pressure compensating drip irrigation hose according to claim 9, wherein the outlet is an open-end outlet or a slit.

11. A strip for distributing water having a repetitive labyrinth segment, wherein a plurality of profiles are provided to a base of the strip, the labyrinth segment comprising:
    a water input section;
    a regulating section arranged downstream from the water input section, wherein the regulating section is provided to regulate water flow rate of the strip in response to water pressure of a hose; and
    a discharge section arranged downstream from the regulating section, wherein the discharge section is provided with deflection-resistant reinforcement means, wherein the profiles in the regulating section comprise first profiles, second profiles and/or further profiles, wherein the first profiles have a rectangular shape whereas the second profiles have a wedge shape.

12. The strip according to claim 11, wherein the entire top surface of the first profiles opposite to the base are connected to an inner part of a hose.

13. A strip for distributing water having a repetitive labyrinth segment, wherein a plurality of profiles are provided to a base of the strip, the labyrinth segment comprising:
    a water input section;
    a regulating section arranged downstream from the water input section, wherein the regulating section is provided to regulate water flow rate of the strip in response to water pressure of a hose; and
    a discharge section arranged downstream from the regulating section, wherein the discharge section is provided with deflection-resistant reinforcement means, wherein the profiles in the regulating section are provided in an alternative and/or regular or irregular fashion throughout the repeated labyrinth segment, wherein the profiles in the discharge section are provided with interconnected reinforcements to increase a resistance to deflection.

14. The strip according to claim 13, wherein the interconnected reinforcements are provided at the base of the strip.

15. The strip according to claim 13, wherein the interconnected reinforcements have a height less than a top surface of the rail of the strip.

* * * * *